United States Patent
Nakamura et al.

(10) Patent No.: US 10,841,454 B2
(45) Date of Patent: Nov. 17, 2020

(54) FACSIMILE DEVICE, IMAGE FORMING APPARATUS, AND DISPLAY CONTROL METHOD OF FACSIMILE DEVICE

(71) Applicant: SHARP KABUSHIKI KAISHA, Osaka (JP)

(72) Inventors: Hiroaki Nakamura, Sakai (JP); Makoto Nakabayashi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/265,776

(22) Filed: Feb. 1, 2019

(65) Prior Publication Data
US 2019/0246002 A1     Aug. 8, 2019

(30) Foreign Application Priority Data
Feb. 7, 2018 (JP) .................................. 2018-020232

(51) Int. Cl.
*H04N 1/32* (2006.01)
*G06F 3/12* (2006.01)

(52) U.S. Cl.
CPC ..... *H04N 1/32657* (2013.01); *H04N 1/32641* (2013.01)

(58) Field of Classification Search
None
See application file for complete search history.

(56) References Cited

U.S. PATENT DOCUMENTS

2015/0138598 A1 * 5/2015 Yamamichi ........ H04N 1/32069
358/1.15

FOREIGN PATENT DOCUMENTS

JP    H04-008572 A    1/1992

* cited by examiner

*Primary Examiner* — Dov Popovici
(74) *Attorney, Agent, or Firm* — ScienBiziP, P.C.

(57) ABSTRACT

A facsimile device performing a successive broadcast to a plurality of destinations includes a memory that stores data, a transmitting unit that transmits the stored data to the destinations by calling the destinations, a determination unit that determines whether the transmission to each of the destinations is successful or unsuccessful, a transmission result holding unit that holds a result of the transmission determined by the determination unit in association with the destination, and a transmission result display unit that displays, subsequent to an end of the transmission, the result of the transmission held by the transmission result holding unit in a display form that is different between when the transmission to the destinations is successful and when the transmission to one or more of the destinations is unsuccessful.

5 Claims, 10 Drawing Sheets

| Job | DESTINATION | START TIME | PAGE COUNT | STATUS |
|---|---|---|---|---|
| | SUCCESSIVE BROADCAST 0123 | 12/31 23:59 | 2202/2202 | 0222/0222 SUCCESSFUL |
| | PC FAX DESTINATION 1 | 10/30 12:24 | 3402/3402 | TRANSMITTED SUCCESSFULLY |
| | 1234567890123456789 | 02/22 05:55 | 3303/4404 | BUSY |
| | 0743654321 | 04/29 03:15 | 5505/6606 | QUIT |
| | SUCCESSIVE BROADCAST 0124 | 08/20 17:40 | 2301/2103 | ----/0701 UNSUCCESSFUL |
| | 1234567890123456 | 11/03 21:45 | 5604/5604 | TRANSMITTED SUCCESSFULLY |
| | PC FAX DESTINATION 2 | 09/27 19:38 | 7707/9909 | QUIT |
| | FAX DESTINATION 1 | 01/25 06:54 | 5406/8709 | BUSY |

JOB STATUS    □ COMMUNICATION IN PROGRESS   ■ PRINTER    RETURN   ?

PRINT / SCANNER / FAX \ INTERNET FAX

CONFIRM RECEIVED DATA
CHECK TRANSFER ERROR BOX OF RECEIVED DATA
RESERVED/EXECUTED
END

FIG. 7

| JOB STATUS | ☐ COMMUNICATION IN PROGRESS   ■ PRINTER | ▽ | RETURN | ? | ✕ |

DETAIL DISPLAY

SUCCESSIVE BROADCAST 0124   PROGRESS: 001/001

| CONTROL NUMBER | DESTINATION | START TIME | STATUS |
|---|---|---|---|
| 001 | 1 | 04/01 09:00 | BUSY |

COMMUNICATION UNSUCCESSFUL | TABLE OF DESTINATIONS

FIG. 8

| JOB STATUS 0124 | ☐ COMMUNICATION IN PROGRESS  ■ PRINTER | ▽ | RETURN | ? |

DETAIL DISPLAY

SUCCESSIVE BROADCAST                                              ◁▭ RE-TRANSMIT TO ALL DESTINATIONS LISTED

| CONTROL NUMBER | DESTINATION | START TIME | STATUS |
|---|---|---|---|
| 001 | 1 | 04/01 09:00 | BUSY |
| 002 | 2 | 01/07 09:00 | TRANSMISSION SUCCESSFUL |

COMMUNICATION UNSUCCESSFUL    TABLE OF DESTINATIONS

FIG. 9

| FAX NUMBER | DATE | START TIME | DESTINATION | LINE | PROCESS TIME | NUMBER OF SHEETS | COMMUNICATION RESULTS | | CONSECUTIVE NUMBERS |
|---|---|---|---|---|---|---|---|---|---|
| 001 | 08/18 | T 0:00 | ABC DIVISION | LINE 1 | 10s | 1 | SUCCESSFUL | G3 | 0000 |
| 002 | | T 1:00 | SUCCESSIVE BROADCAST 0101 | | 105m25s | 3 | SUCCESSIVE BROADCAST (OUT OF 200 COMMUNICATIONS: 200 SUCCESSFUL) | | 0101 |
| 003 | | 10:00 | 1234567890123456789+ | LINE 2 | 1m12s | 5 | CANCELLED | G3 | 0102 |
| 004 | 08/19 | 0:00 | 1234567890123456789+ | AUTOMATIC 1 | | 10 | BUSY | | 0103 |
| 005 | | 1:00 | 7890123456 | LINE 1 | 5m25s | 7 | COMMUNICATION ERROR 14 (0000) | SG3 | 0104 |
| 006 | | T 2:00 | ABCDEFGHIJKLMNOPQR | LINE 1 | 1m25s | 4 | COMMUNICATION ERROR 35 (0000) | SG3 | 0105 |
| 007 | | T 3:00 | abcdefghij | LINE 2 | 3m25s | 1 | MEMORY SUCCESSFUL | SG3 | 0106 |
| 008 | | 4:00 | XYZ DIVISION | AUTOMATIC 1 | 5s | | POLLING NOT ACCEPTED | SG3 | 0107 |
| 009 | 08/21 | 20:00 | RELAY GROUP 05 | LINE 1 | 1m25s | 1 | SUCCESSFUL | SG3 | 0109 |
| 010 | | 20:30 | PRINT DIVISION | LINE 2 | 10m00s | 2 | SUCCESSFUL | ECM | 0110 |
| 011 | | 21:51 | SUCCESSIVE BROADCAST 0111 | | 55m25s | 3 | *SUCCESSIVE BROADCAST (OUT OF 80 COMMUNICATIONS: 72 SUCCESSFUL) | | 0111 |
| 012 | | 23:25 | 0120-1112345 | LINE 1 | 3m25s | 1 | *SUCCESSFUL | SG3 | 0112 |
| 013 | 08/22 | 10:01 | 1234567890123456789+ | LINE 1 | | 3 | PARTNER NOT RESPONDING | | 0113 |
| 014 | | 11:00 | a | AUTOMATIC 1 | 59s | 3 | NO OUTPUT | ECM | 0114 |
| 015 | | 11:15 | SUCCESSIVE BROADCAST 0115 | | 300m55s | 100 | POLLING SUCCESSIVE BROADCAST (OUT OF 50 COMMUNICATIONS: 45 SUCCESSFUL) | | 0115 |
| 016 | | 21:30 | 00435363434 | LINE 1 | 3m20s | 5 | (RECEIVED) SUCCESSFUL | SG3 | 0116 |
| 017 | 08/23 | 12:21 | SUCCESSIVE POLLING 0120 | LINE 1 | 3m21s | 1 | SUCCESSIVE POLLING (OUT OF 2 COMMUNICATIONS: 2 SUCCESSFUL) | | 0120 |
| 018 | | 15:55 | 9876543210/0011/ | LINE 1 | 1m15s | 5 | SUCCESSFUL | SG3 | 0121 |
| 019 | | 21:21 | RELAY BROADCAST 0122 | | 15m25s | 7 | MEMORY BOX: SALES COMPANY RELAY BROADCAST | | 0122 |
| 020 | 08/24 | 03:33 | 1234567890/0011/ | LINE 2 | 10s | 5 | (OUT OF 30 COMMUNICATIONS: 24 SUCCESSFUL) COMMUNICATION ERROR 24 (0000) | SG3 | 0123 |
| 021 | | 08:20 | 1234567890 | | 15m05s | 5 | TRANSFER SUCCESSFUL | SG3 | 0124 |
| TOTAL SUM | | | | | 8h47m52s | 172 | | | |
| GRAND SUM | | | | | 99999999h59m59s | 99999999 | | | |

FIG. 10

| FAX | | | | | | | | |
|---|---|---|---|---|---|---|---|---|
| NUMBER | DATE | START TIME | DESTINATION | LINE | PROCESS TIME | NUMBER OF SHEETS | COMMUNICATION RESULTS | | CONSECUTIVE NUMBERS |
| 001 | 08/18 | T 0:00 | ABC DIVISION | LINE 1 | 10s | 1 | SUCCESSFUL | G3 | 0000 |
| 002 | | T 1:00 | SUCCESSIVE BROADCAST 0101 | | 105m25s | 3 | SUCCESSIVE BROADCAST :OUT-OF-200 COMMUNICATIONS: 200 SUCCESSFUL | | 0101 |
| 003 | | 10:00 | 1234567890123456789+ | LINE 2 | 1m12s | 5 | CANCELLED | G3 | 0102 |
| 004 | 08/19 | 0:00 | 1234567890123456789+ | AUTOMATIC 1 | | 10 | BUSY | | 0103 |
| 005 | | 1:00 | 7890123456 | LINE 1 | 5m25s | 7 | COMMUNICATION ERROR 14 (0000) | SG3 | 0104 |
| 006 | | T 2:00 | ABCDEFGHIJKLMNOPQR | LINE 1 | 1m25s | 4 | COMMUNICATION ERROR 35 (0000) | SG3 | 0105 |
| 007 | | T 3:00 | a b c d e f g h i j | LINE 2 | 3m25s | 1 | MEMORY SUCCESSFUL | SG3 | 0106 |
| 008 | | 4:00 | XYZ DIVISION | AUTOMATIC 1 | 5s | | POLLING NOT ACCEPTED | SG3 | 0107 |
| 009 | 08/21 | 20:00 | RELAY GROUP 05 | LINE 1 | 1m25s | 1 | SUCCESSFUL | SG3 | 0109 |
| 010 | | 20:30 | PRINT DIVISION | LINE 2 | 10m00s | 2 | SUCCESSFUL | ECM | 0110 |
| 011 | | 21:51 | SUCCESSIVE BROADCAST 0111 | | 55m25s | 3 | * SUCCESSIVE BROADCAST :OUT-OF-01 COMMUNICATIONS:2 SUCCESSFUL AND 6 UNSUCCESSFUL | | 0111 |
| 012 | | 23:25 | 0120-1112345 | LINE 1 | 3m25s | 1 | * SUCCESSFUL | SG3 | 0112 |
| 013 | 08/22 | 10:01 | 1234567890123456789+ | LINE 1 | | 3 | PARTNER NOT RESPONDING | | 0113 |
| 014 | | 11:00 | a | AUTOMATIC 1 | 59s | 3 | NO OUTPUT | ECM | 0114 |
| 015 | | 11:15 | SUCCESSIVE BROADCAST 0115 | LINE 1 | 300m55s | 100 | POLLING SUCCESSIVE BROADCAST :OUT-OF-50 COMMUNICATIONS:45 SUCCESSFUL AND 5 UNSUCCESSFUL | | 0115 |
| 016 | | 21:30 | 0043563434 | LINE 1 | 3m20s | 5 | (RECEIVED) SUCCESSFUL | SG3 | 0116 |
| 017 | 08/23 | 12:21 | SUCCESSIVE POLLING 0120 | | 3m21s | 1 | SUCCESSIVE POLLING OUT-OF-2 COMMUNICATIONS, 2 SUCCESSFUL | | 0120 |
| 018 | | 15:55 | 9876543210/0011/ | LINE 1 | 1m15s | 5 | SUCCESSFUL | SG3 | 0121 |
| 019 | | 21:21 | RELAY BROADCAST 0122 | | 15m25s | 7 | MEMORY BOX: SALES COMPANY RELAY BROADCAST :OUT-OF-3 COMMUNICATIONS:2/3 SUCCESSFUL AND 1 UNSUCCESSFUL | | 0122 |
| 020 | 08/24 | 03:33 | 1234567890/0011/ | LINE 2 | 10s | 5 | UNSUCCESSFUL COMMUNICATION ERROR 24 (0000) | SG3 | 0123 |
| 021 | | 08:20 | 1234567890 | | 15m05s | 5 | TRANSFER SUCCESSFUL | SG3 | 0124 |
| TOTAL SUM | | | | | 8h47m52s | 172 | | | |
| GRAND SUM | | | | | 999999h59m59s | 99999999 | | | |

FACSIMILE DEVICE, IMAGE FORMING APPARATUS, AND DISPLAY CONTROL METHOD OF FACSIMILE DEVICE

BACKGROUND

1. Field

The present disclosure relates to a facsimile device, an image forming apparatus including the facsimile device, and a display control method of the facsimile device.

2. Description of the Related Art

Some of the facsimile devices of the related art include a terminal having a successive broadcast functionality, and transmit image information having the same contents and stored on a storage device thereof to multiple destinations.

In the successive broadcast functionality, successive job communication (a successive broadcast or successive polling) is performed for multiple transmission destinations. When image information having the same contents is transmitted to the multiple destinations, one or more of the destinations may result in a communication error, or busy, or the image information may remain undelivered. For example, "XXX/YYY SUCCESSFUL" (XXX: number of destinations with which the communication is successful, and YYY: total number of destinations) is displayed on the screen indicating the transmission results. Even if the communication is unsuccessful, only the number of successful transmissions is displayed in this way.

As described above, the results are displayed on a single row, and, when the results indicate that the number of destinations to which transmission has been completed successfully≠the total number of destinations, the user can recognize that there is at least a destination to which the transmission is unsuccessful. However, since there is no indication of unsuccessful transmission, the user may be under the mistaken impression that there is not any destination to which the transmission is unsuccessful.

Japanese Unexamined Utility Model Registration Application Publication No. 4-8572 describes a successive broadcast functionality. According to the description, when facsimile transmission is made to multiple destinations, the results of the transmission to each destination are determined. The total number of destinations and the number of destinations to which the transmission is successful are displayed as the transmission results. The number of destinations to which the transmission is unsuccessful is not displayed. There is still a possibility that the user may be under the mistaken impression.

As for successive jobs, the jobs may be displayed one by one according to the destinations and the transmission results may be displayed without any discrimination from a job intended for a single destination. The detail may be confirmed, but if there are a large number of destinations, the user may have difficulty in differentiating one job from another, and in finding a target job.

It is desirable to provide a facsimile device, an image forming apparatus including the facsimile device, and a display control method of the facsimile device that distinctly notifies the user that an unsuccessful transmission has occurred in successive jobs if the transmission is unsuccessful.

SUMMARY

According to an aspect of the disclosure, there is provided a facsimile device. The facsimile device performing a successive broadcast to a plurality of destinations, includes a memory that stores data, a transmitting unit that transmits the stored data to the destinations by calling the destinations, a determination unit that determines whether the transmission to each of the destinations is successful or unsuccessful, a transmission result holding unit that holds a result of the transmission determined by the determination unit in association with the destination, and a transmission result display unit that displays, subsequent to an end of the transmission, the result of the transmission held by the transmission result holding unit in a display form that is different between when the transmission to the destinations is successful and when the transmission to one or more of the destinations is unsuccessful.

According to another aspect of the disclosure, there is provided an image forming apparatus the image forming apparatus includes the facsimile device.

According to another aspect of the disclosure, there is provided a display control method of a facsimile device that performs a successive broadcast to a plurality of destinations. The display control method includes storing data on a first memory, transmitting the data stored on the first memory to the destinations by calling the destinations, determining whether the transmission to each of the destinations is successful or unsuccessful, holding on a second memory a result of the transmission determined in the determining in association with the destination, and subsequent to an end of the transmission, displaying the result of the transmission held on the second memory in a display form that is different between when the transmission to the destinations is successful and when the transmission to one or more of the destinations is unsuccessful.

BRIEF DESCRIPTION OF THE DRAWINGS

FIG. 7 illustrates an example of the completion display screen, and thus illustrates the detail display on the screen;

FIG. 8 illustrates an example of the completion display screen concerning the unsuccessful transmission in the similar case as in FIG. 6, and thus illustrates the detail of the transmission on each destination;

FIG. 9 illustrates an example of a communication recording log on the facsimile device of the related art; and FIG. 10 illustrates a communication recording log on the facsimile device of the embodiment.

DESCRIPTION OF THE EMBODIMENTS

Embodiment of the disclosure is described with reference to the drawings.

Figure 1:
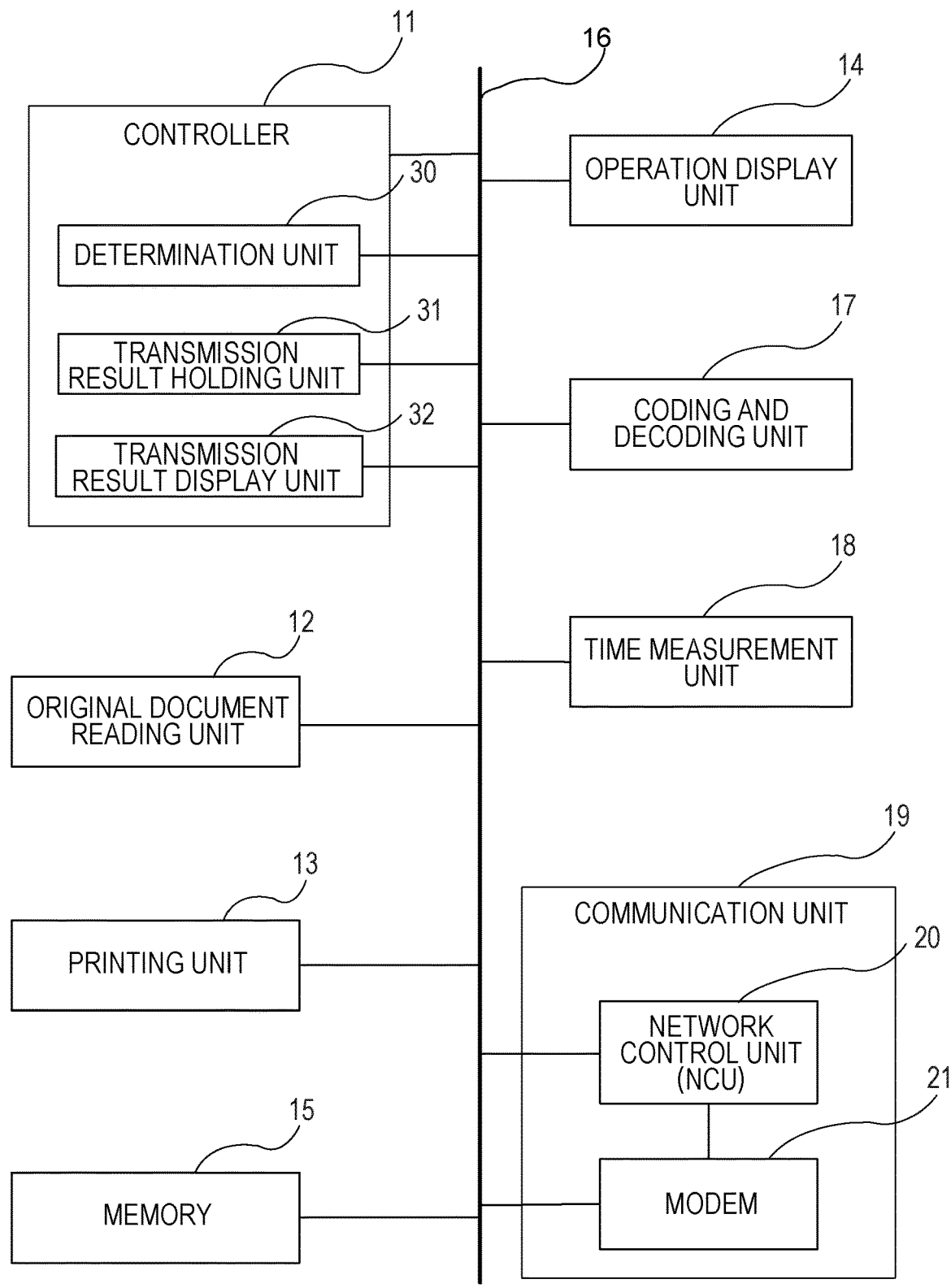
FIG. 1 is a block diagram of a multi-function apparatus including a facsimile device of an embodiment of the disclosure.

FIG. 1 is a block diagram of a multi-function apparatus 100 having a facsimile functionality as a facsimile device of the embodiment. Referring to FIG. 1, the multi-function apparatus 100 includes a controller 11, an original document reading unit 12, a printing unit 13, an operation display unit 14, a memory 15, a coding and decoding unit 17, a time measurement unit 18, a communication unit 19, and the like. These elements are interconnected to each other via a bus 16. The communication unit 19 transmits and receives data to and from the outside via a communication network. Since the multi-function apparatus 100 includes the original document reading unit 12, the printing unit 13, and the like, it has a functionality of an image forming apparatus.

The multi-function apparatus 100 of the embodiment has the facsimile functionality that performs a successive broadcast (successive jobs or successive polling) to transmit image data to multiple transmission destinations. An example of the image data is a job.

The original document reading unit 12 in the multi-function apparatus 100 includes an optical sensor, such as a charge-coupled device (CCD). The original document reading unit 12 under the control of the controller 11 reads an original image at a predetermined resolution with the optical sensor, and obtains the image data for transmission. The image data read and obtained by the original document reading unit 12 is stored on the memory 15.

The printing unit 13 includes a light source, such as a semiconductor laser or a light-emitting diode (LED), a photoconductor drum that collects toner thereon, and a fixing device that transfers the toner to a printing sheet and fixes the toner onto the printing sheet using heat and pressure. The printing unit 13 forms (prints) on a medium, such as the printing sheet, an image received from another facsimile device through facsimile communication via a communication network. The data of the image received via the facsimile communication is stored on the memory 15. The printing unit 13 prints the image in response to the image data read from the memory 15.

The operation display unit 14 includes a variety of keys receiving a user's operations, including a start key, numerical keys, and function keys. By operating the keys on the operation display unit 14, the user using the multi-function apparatus 100 inputs a transmission destination, and an instruction to display the detail of complete job communication, sets the resolution at which an original document is read, and checks the communication results. Upon receiving the user's key operation, the operation display unit 14 transfers to the controller 11 a signal representing the contents of the operation. The controller 11 thus performs a process responsive to the user's operation.

The operation display unit 14 includes a display, such as a liquid-crystal display (LCD) or an electroluminescent (EL) panel, and displays characters and images under the control of the controller 11. The operation display unit 14 displays setting items and menus to operate the multi-function apparatus 100, and an operation status of the multi-function apparatus 100. For example, the operation display unit 14 displays a communication status. For example, concerning the communication status, the operation display unit 14 displays the number of successful transmissions/the total number of transmission destinations if the transmission to all the destinations is successful, an indication that one or more transmissions are unsuccessful if the transmission to one or more destinations is unsuccessful, a table of transmission destinations in detail, and a variety of warning messages. Optionally, the operation display unit 14 may be covered with a touch panel.

The memory 15 includes a rewritable mass storage memory device, such as a dynamic random access memory (DRAM) or a flash memory. The memory 15 temporarily stores data, such as an image read by the original document reading unit 12 or an image received via the facsimile communication. If the memory 15 includes a non-volatile memory, such as a flash memory, or if the memory 15 includes a non-volatile memory, such as a mask read-only memory (ROM), or an electrically erasable programmable ROM (EEPROM), the memory 15 pre-stores a variety of programs executed by the controller 11 and data including tables.

The coding and decoding unit 17 reduces an amount of the image data to be transmitted via the facsimile communication by performing coding in a predetermined format on the image data read and obtained by the original document reading unit 12. Also, the coding and decoding unit 17 receives coded image data from another facsimile device via the facsimile communication, and performs a process to decode the image data back to an original format (process related to image forming). More specifically, the coding and decoding unit 17 under the control of the controller 11 codes the image data for transmission read by the original document reading unit 12 and then stores the coded image data onto the memory 15, and decodes the received image data and transfers the decoded image data to the printing unit 13.

The time measurement unit 18 measures time and notifies the controller 11 of the measured time. The time measurement unit 18 under the control of the controller 11 starts and stops time measurement, resets the time measured, and the like.

The communication unit 19 transmits and receives data to and from another facsimile device via the communication network, and includes a network control unit (NCU) 20 and a modem 21. The NCU 20 performs network control to connect to or disconnect from the communication network, such as an analog public telephone network. The NCU 20 under the control of the controller 11 connects the modem 21 to the communication network. In accordance with a predetermined facsimile communication protocol, the NOD 20 transmits and receives image data and control signals and performs automatic calling and response processes of the facsimile communication.

In accordance with standards for the facsimile communication, the modem 21 modulates the image data for transmission into an analog signal in an format appropriate for the transmission via the communication network, and obtains image data by demodulating an analog signal incoming from another facsimile device. The modem 21 detects from the received signal an eye quality monitor (EQM) value indicative of communication quality and a signal from which communication malfunction is determined.

The multi-function apparatus 100 thus obtains the image data for transmission by reading original image data with the original document reading unit 12, and codes the image data with the coding and decoding unit 17. The multi-function apparatus 100 thus reduces the amount of image data. The multi-function apparatus 100 transmits the coded image data (a job) to another facsimile device via the communication network with the communication unit 19. Upon receiving data from another facsimile device via the communication network, the multi-function apparatus 100 obtains image data by demodulating the received data with the communication unit 19, decodes the image data with the coding and decoding unit 17, and prints an image on a printing sheet with the printing unit 13.

The multi-function apparatus 100 of the embodiment has the functionality of the facsimile device that performs a successive broadcast (successive jobs, or successive polling) to multiple destinations.

The multi-function apparatus 100 includes the memory 15 that stores the image data, and the communication unit (corresponding to a transmission unit) 19 that transmits the stored data by calling multiple destinations. The controller 11 includes a determination unit 30, a transmission result holding unit 31, and a transmission result display unit 32. The determination unit 30 determines whether the transmission to each of the destinations is successful or not. The transmission result holding unit 31 holds (stores) the transmission results determined by the determination unit 30 in association with the destination. The transmission result display unit 32 causes the operation display unit 14 to display the transmission results held by the transmission result holding unit 31 in a display form that is different between when the transmission to all the destinations is successful and when the transmission to one or more destinations is unsuccessful. The transmission result holding unit 31 may store the transmission results on the memory 15.

If the transmission to all the destinations is successful, the transmission result display unit 32 causes the operation display unit 14 to display an indication that the transmission is successful. If the transmission to one or more destinations is unsuccessful, the transmission result display unit 32 causes the operation display unit 14 to display an indication of the total number of destinations and that the transmission to one or more destinations is unsuccessful.

Figure 4:
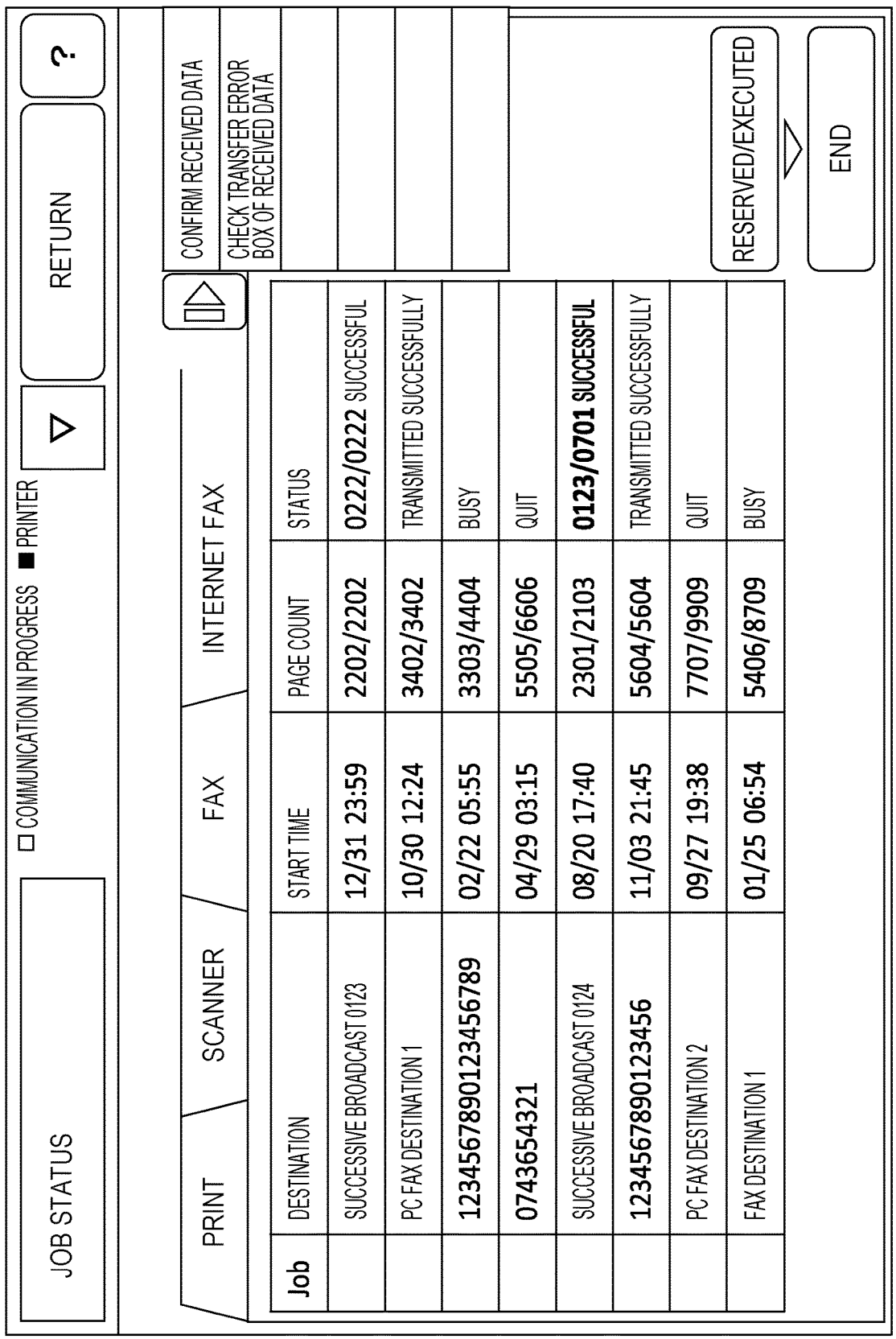
FIG. 4 illustrates an example of a job status image on a transmission result display unit in the facsimile device of the related art and thus a transmission complete queue screen on the facsimile device of the related art.
Figure 5:
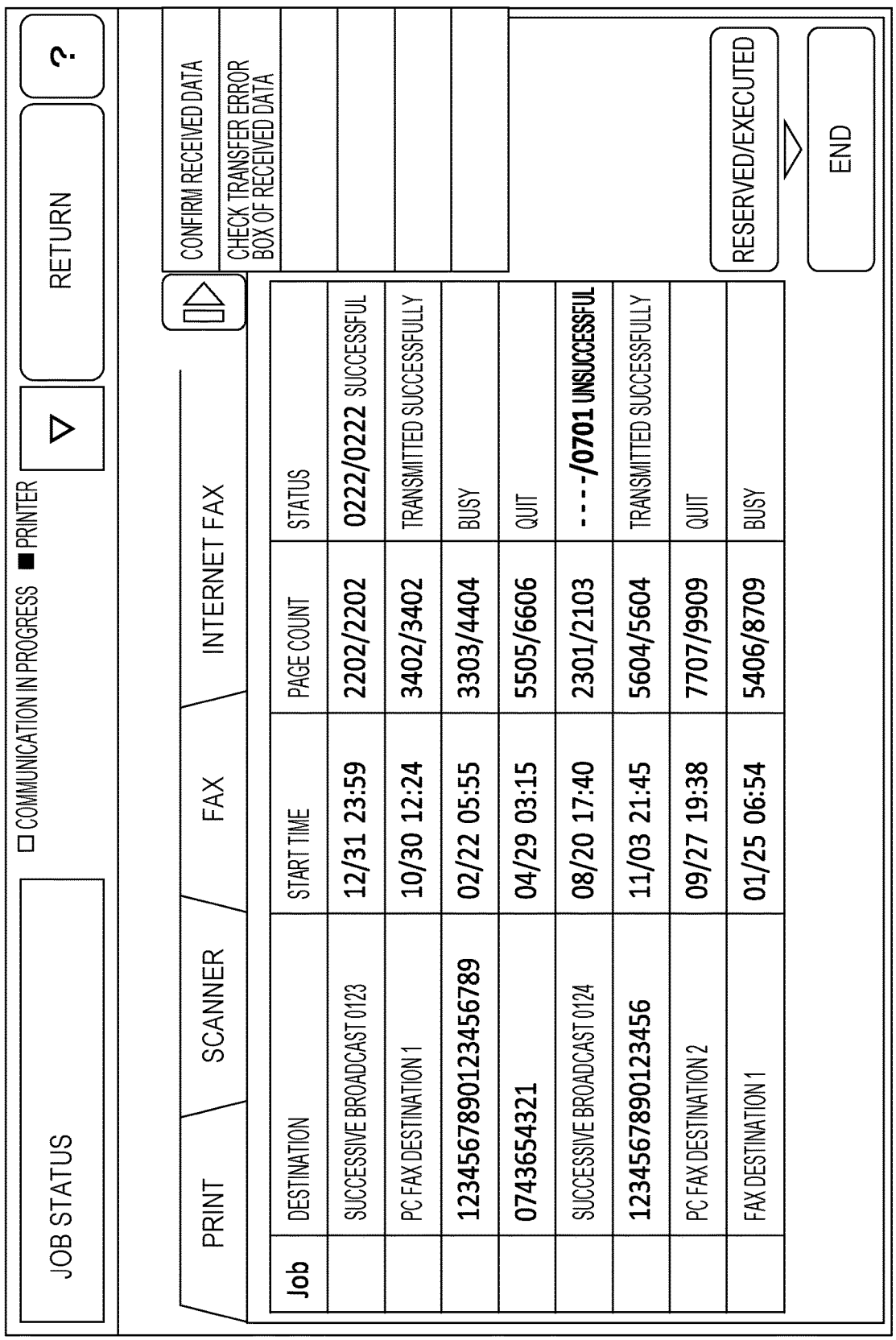
FIG. 5 illustrates an example of a job status image on a transmission result display unit and thus a transmission complete queue screen on the facsimile device of the embodiment.
Figure 6:
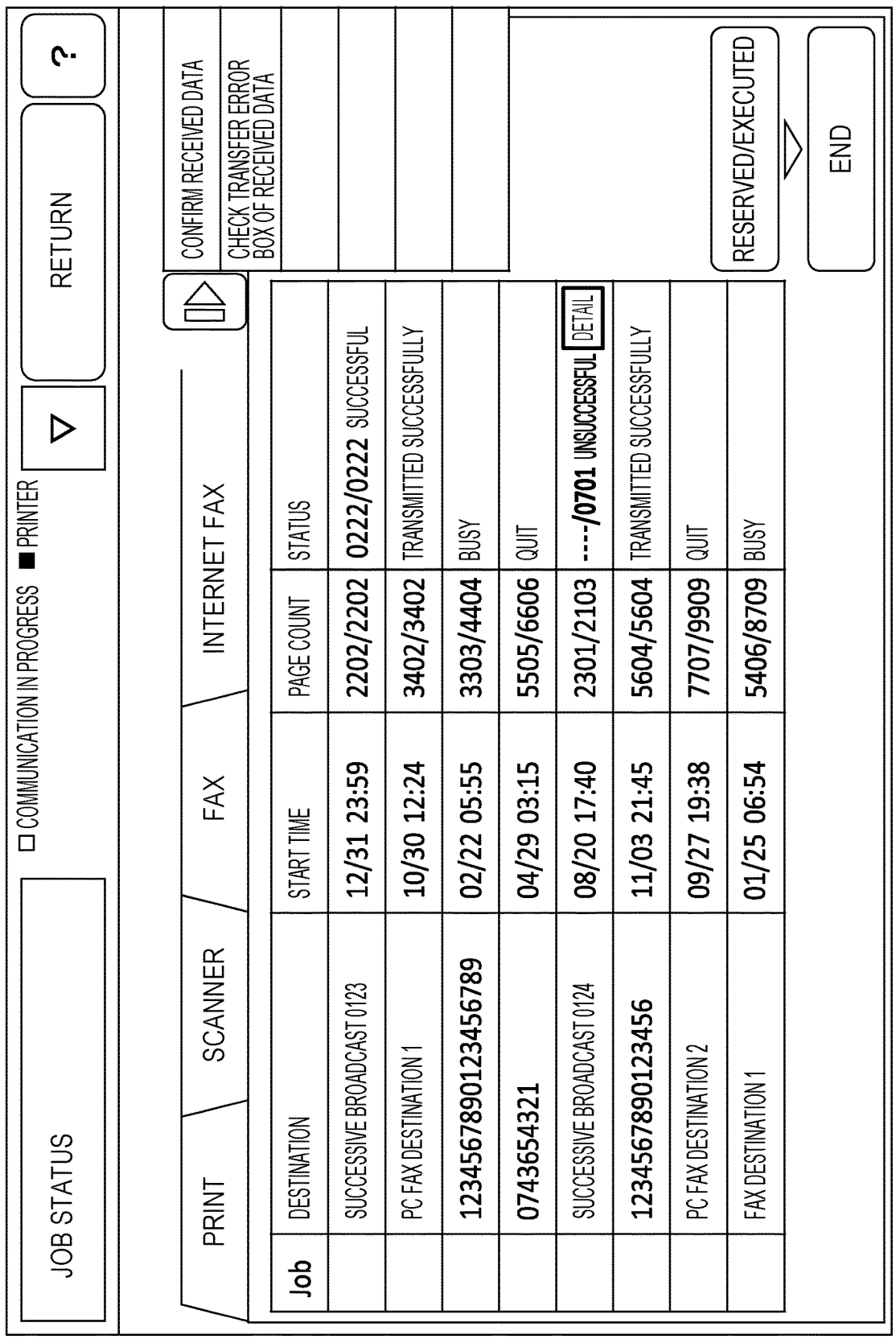
FIG. 6 illustrates an example of a completion display screen on the facsimile device of the embodiment and thus indicates an unsuccessful transmission and prompts a user to perform an operation for detail display.

The operation display unit 14 is a detail display unit that displays the destinations and the transmission results. If the transmission to one or more destinations is unsuccessful, the transmission result display unit 32 causes the operation display unit 14 to display the total number of destinations and the event of the unsuccessful transmission, and performs display or notification to prompt the user to cause the operation display unit 14 to display the destinations and the transmission results. Examples of a display screen on the operation display unit 14 are illustrated in FIG. 4 through FIG. 6. Transmission recording of the related art is illustrated in FIG. 9, and transmission recording of the embodiment is illustrated in FIG. 10.

Detailed control of the multi-function (facsimile) apparatus 100 is described with reference to FIG. 2 and FIG. 3.

Flow of display process on complete job status screen.

Figure 2:
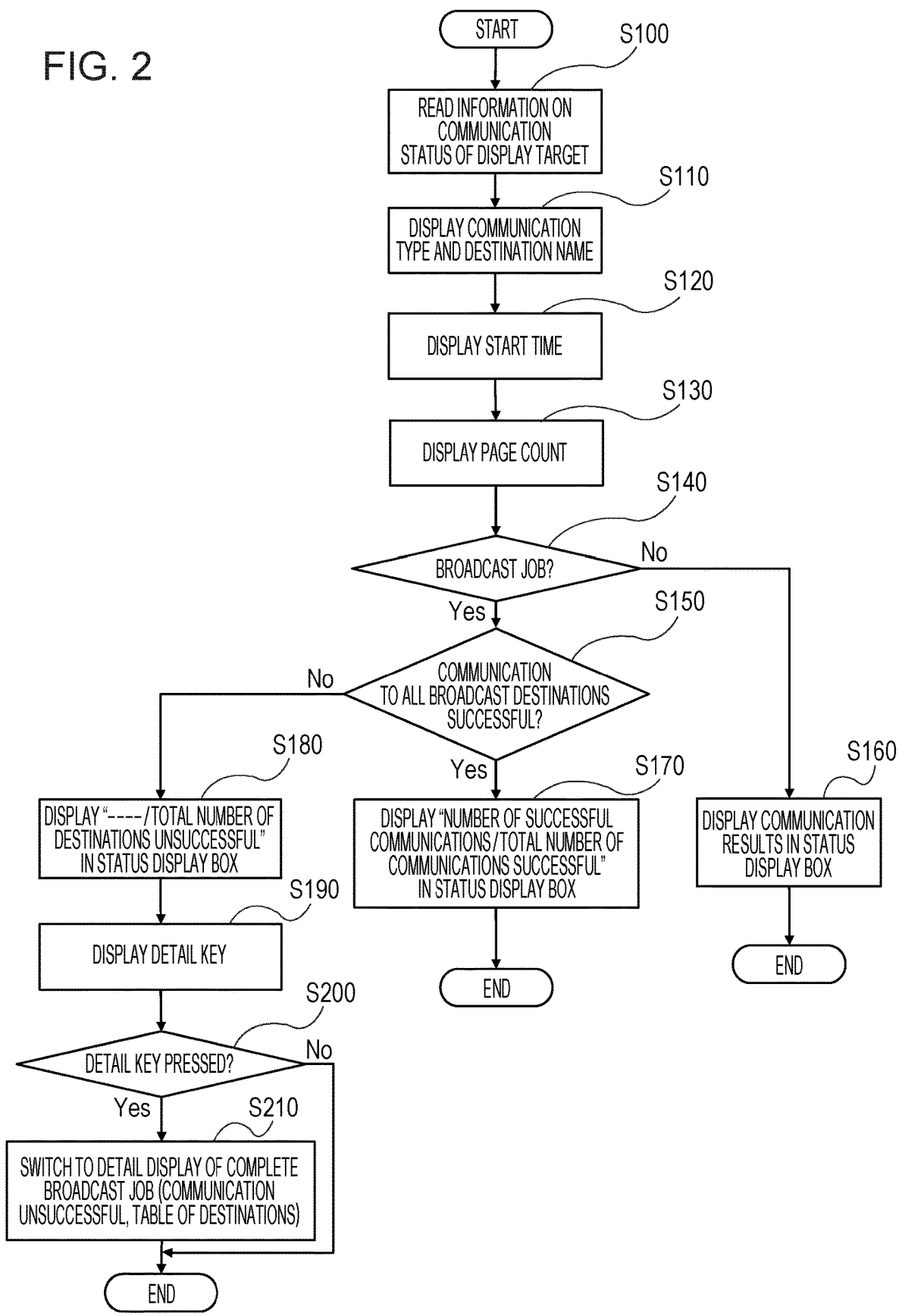
FIG. 2 is a flowchart illustrating a display process performed on a complete job status screen of the facsimile device of the embodiment.

FIG. 2 is a flow illustrating a display process performed on a complete job status screen in the facsimile functionality.

A communication status on a job serving as a display target is detected as illustrated in FIG. 2 in step 100 (hereinafter, abbreviated as "S100" or the like).

The multi-function apparatus 100 displays a communication type and destination name on the operation display unit 14 (S110).

The multi-function apparatus 100 displays start time (S120), a page count (S130), and determines whether the job serving as the display target is a broadcast job (S140).

If the determination results are positive, namely, if the job is a broadcast job (Yes in S140), the multi-function apparatus 100 determines whether the communication (transmission) of the broadcast job with all the destinations is successful (S150).

If the determination results in the determination operation S140 are negative, namely, if the job is not a broadcast job (No in S140), the multi-function apparatus 100 displays the communication results in a status display box (S160), and ends the process (END).

If it is determined in S150 that the communication with all the destinations is successful (Yes in S150), the multi-function apparatus 100 displays the "number of successful communications/total number of destinations successful" in the status display box on the operation display unit 14 (S170), and ends the process (END).

If is determined in S150 that the communication with all the destinations is not successful and the communication with one or more destinations is unsuccessful (No in S150), the multi-function apparatus 100 displays "----/total number of destinations unsuccessful" in the status display box on the operation display unit 14 (S180) (symbol ---- indicates the number of unsuccessful communications).

If the transmission to all the destinations is successful (Yes in S150), the operation display unit 14 serving as a transmission result display unit displays an indication of the success (S170), and ends the process (END). If the transmission to one or more destinations is unsuccessful (No in S150), the operation display unit 14 displays an indication of the total number of destinations and the event of the unsuccessful transmission (S180).

The multi-function apparatus 100 displays on the operation display unit 14 (corresponding to a detail display unit) a detail key that prompts the user to perform an operation for displaying the detailed results (to display the destination and the results of the transmission to the destinations) (S190).

The multi-function apparatus 100 determines whether the detail key has been pressed (S200). If the multi-function apparatus 100 determines that the detail key is pressed. (yes from S200), the multi-function apparatus 100 displays the detail of the complete broadcast job (S210), and ends the process (END).

If the detail key has not been pressed (No in S200), the multi-function apparatus 100 does not present the detail display and ends the process (END).

Update Process on Result Recording and Result Display Screen

Figure 3:
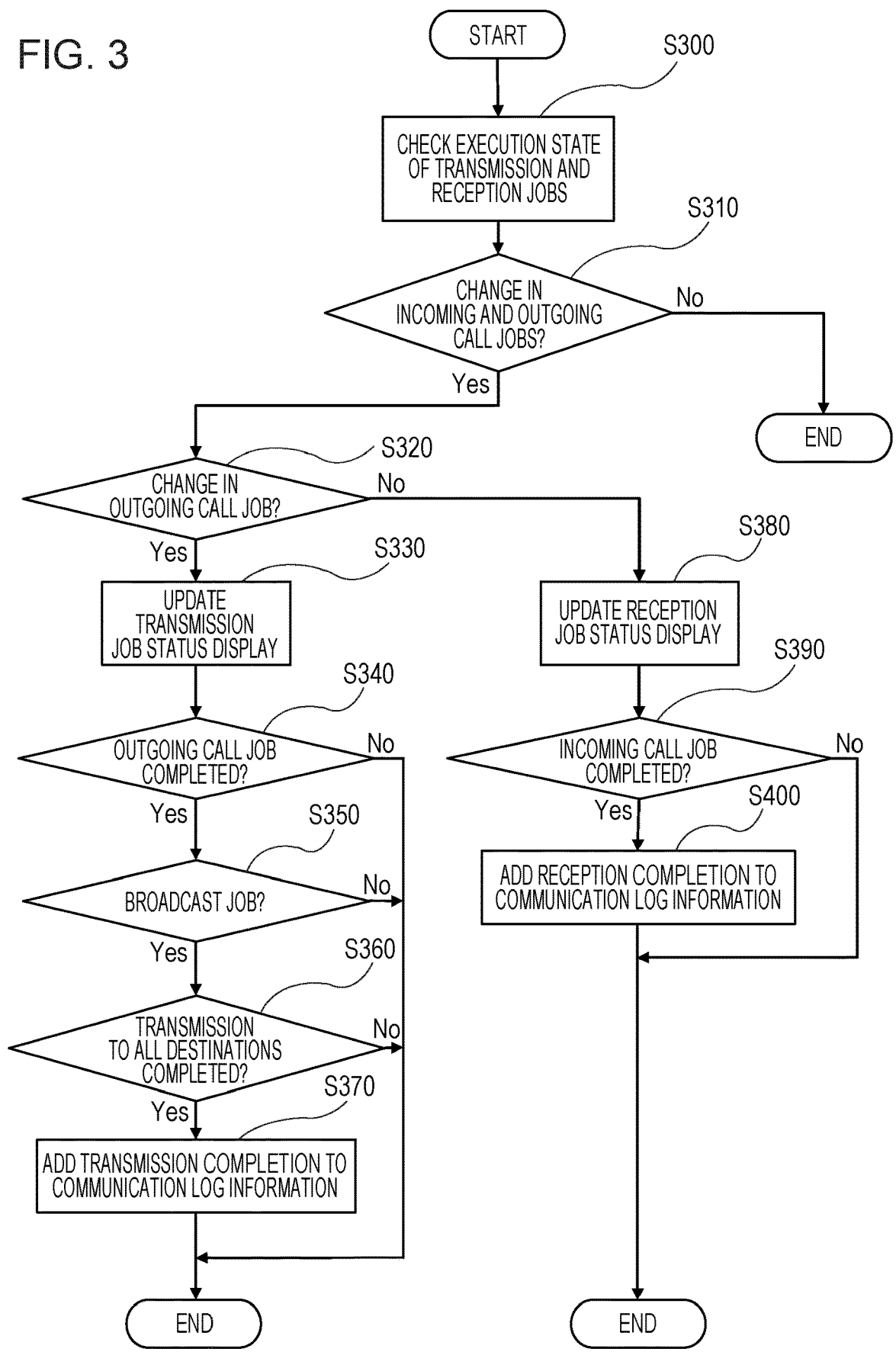
FIG. 3 is a flowchart illustrating updating of a result recording and result display screen of the facsimile device of the embodiment.

FIG. 3 is a flowchart illustrating updating of a job result recording and result display screen on the facsimile device.

Referring to FIG. 3, the multi-function apparatus 100 detects the progress status of a transmission and reception job (S300), and determines whether a change has occurred in incoming and outgoing call jobs (S310).

If it is determined in S310 that the determination results are positive with a change having occurred in the incoming and outgoing call jobs (Yes in S310), the multi-function apparatus 100 determines whether the change has occurred in the outgoing call job (S320). If no change has occurred in the incoming and outgoing call jobs (no from S310), the multi-function apparatus 100 ends the process (END).

If the determination results in S320 are positive, and if it is determined that a change has occurred in the outgoing call job (yes from S320), the multi-function apparatus 100 updates the display of the transmission job status (S330). The multi-function apparatus 100 determines whether the outgoing call job has been completed (S340). If it is determined that the outgoing call job has been completed (Yes in S340), the multi-function apparatus 100 determines whether the outgoing call job is a broadcast job (S350).

If the outgoing call job is a broadcast job (Yes in S350), the multi-function apparatus 100 determines whether the transmission to all the destinations has been completed (S360). If the transmission to all the destinations has been completed (Yes in S360), the multi-function apparatus 100 adds the transmission completion to communication log information (S370), and ends the process (END).

If the outgoing call job has not been completed (No in S340), or if the outgoing call job is not a broadcast job (No in S350), or if the transmission to all the destinations has not been completed (No in S360), the multi-function apparatus 100 ends the process (END).

If the change is not a change in the outgoing call job (No in S320), the multi-function apparatus 100 updates the display of a reception job status (S380). The multi-function apparatus 100 then determines whether the incoming call job has been completed (S390). If the incoming call job has been completed. (Yes in S390), the multi-function apparatus 100 adds the reception completion to the communication log information (S400), and ends the process (END) if the incoming call job has not been completed (No in S390), the multi-function apparatus 100 ends the process (END).

Display examples on the operation display unit 14 in the facsimile device of the embodiment are described below.

FIGS. 4 and 5 illustrate examples of job status images on the transmission result display unit in the facsimile device. FIG. 4 illustrates an example of a transmission complete queue screen on the facsimile device of the related art, and FIG. 5 illustrates an example of a transmission complete queue screen on the facsimile device of the embodiment.

Referring to FIG. 4, the facsimile device of the related art displays "0222/0222 SUCCESSFUL" for the successive broadcast job 0123, indicative of the successful transmission to all the destinations.

However, in the case of the successive broadcast job 0124 far other jobs, the communication status is displayed as "0123/0701 SUCCESSFUL". In the related art, the number of successful transmissions: 0123 is displayed with respect to the total number of destinations: 0701. Since the number of successful transmission is not equal to the total number of destinations, careful looking reveals that the transmission to some destinations is unsuccessful. Regardless of whether the transmission to all the destinations is successful or the transmission to a subset of the destinations is unsuccessful, the word "SUCCESSFUL" is displayed while the word "UNSUCCESSFUL" is not displayed. The user may be under the impression that the transmission to all the destinations is successful.

Referring to FIG. 5, the facsimile device of the embodiment displays "0222/0222 SUCCESSFUL" for the successive broadcast job 0123, indicative of the successful transmission to all the destinations.

On the other hand, if the job is the successive broadcast 0124, the communication status displayed is "----/0701 UNSUCCESSFUL" (symbol ---- represents the number of unsuccessful transmissions). Since the number of unsuccessful transmissions is one or more with respect to the total number of destinations of 0701, the word "UNSUCCESSFUL" is displayed.

If the transmission to all the destinations is successful, the transmission result display unit displays the word "SUCCESSFUL". On the other hand, if the transmission to one or more destinations is unsuccessful, the transmission result display unit displays the total number of destinations and the event of unsuccessful transmission together by the word "UNSUCCESSFUL".

The word "UNSUCCESSFUL" displayed helps the user to clearly recognize the unsuccessful transmission. The user thus correctly understands the unsuccessful transmission.

FIGS. 6 through 8 illustrate examples of a completion display screen on the facsimile device of the embodiment. FIG. 6 illustrates a screen that notifies the user that the transmission is unsuccessful and prompts the user to perform an operation for the detail display. FIG. 7 illustrates a screen of the detail display. FIG. 8 illustrates a screen of other detail display.

Referring to FIG. 6, the job is the successive broadcast 0124, and the communication status displayed is "----/0701 UNSUCCESSFUL DETAIL" (symbol ---- represents the number of unsuccessful transmissions). The letter "DETAIL" (detail key) displayed prompts the user to perform an operation for the detail display. Messages reading "Confirm received data" and "Check transfer error box of received data" are displayed near the top right corner of the screen. In this case, the display example indicates the detail key for "DETAIL" for the unsuccessful transmission. In other cases, the detail key may be displayed if the transmission to all the destinations is successful, if the transmission quits, and if the destination is busy.

FIG. 7 illustrates the example of the detail screen. The start time, and the transmission status being busy are displayed with respect to destination "1", and the cause for undelivered transmission is thus understood.

FIG. 8 illustrates an example of the completion display screen indicating the unsuccessful transmission in a way similar to FIG. 6. A busy status is displayed for the destination. "1", and successful transmission is displayed for destination "2". Message reading "Re-transmit to all destinations listed" is displayed near the top right corner of the screen.

FIG. 9 illustrates an example of a communication log of a facsimile device of the related art. FIG. 10 illustrates an example of a communication log of the facsimile device of the embodiment. Note that jobs 001 and subsequent numbers are job numbers listed in a number column.

Referring to FIG. 9, the communication log of the related art indicates "out of 200 communications, 200 successful" indicative of the successful transmission to all the destinations for a successive broadcast 0101 for job 002.

The communication log of the related art indicates "out of 80 communications, 72 successful" indicative of the unsuccessful transmission to a subpart of the destinations for a successive broadcast 0111 for job 011.

The communication log of the related art indicates "out of 50 communications, 45 successful" indicative of the unsuccessful transmission to a subpart of the destinations for a successive broadcast 0115 for job 015.

The communication log of the related art indicates "out of 2 communications, 2 successful" indicative of the successful transmission to all the destinations for successive polling 0120 for job 017.

The communication log of the related art indicates "out of 30 communications, 21 successful" indicative of the unsuccessful transmission to a subpart of the destinations for relay broadcast 0122 for job 019.

As described above, the word "successful" is displayed even if the transmission to a subpart of the destinations is unsuccessful. This may lead to a confusing interpretation.

According to the embodiment as illustrated in FIG. 10, the communication log indicates "out of 200 communications, 200 successful" indicative of the successful transmission to all the destinations for the successive broadcast 0101 for the job 002.

The communication log indicates "out of 80 communications, 72 successful and 8 unsuccessful" indicative of the unsuccessful transmission to a subpart of the destinations for the successive broadcast 0111 for the job 011.

The communication log indicates "out 50 communications, 45 successful and 5 unsuccessful" indicative of the unsuccessful transmission to a subpart of the destinations for the successive broadcast 0115 for the job 015.

The communication log indicates "out of 2 communications, 2 successful" indicative of the successful transmission to all the destinations for the successive polling 0120 for the job 017.

The communication log indicates "out of 30 communications, 21 successful and 9 unsuccessful" indicative of the unsuccessful transmission to a subpart of the destinations for the relay broadcast 0122 for the job 019.

According to the embodiment, the number of destinations to which the transmission is unsuccessful is displayed. In comparison with the related art where only the word "successful" is displayed, the embodiment displays the number of unsuccessful transmissions with the word "unsuccessful". The user thus clearly recognizes the transmission failure.

The facsimile device of the embodiment includes the transmission result display unit 32. The transmission result display unit 32 displays the transmission results, held on the memory 15 by the transmission result holding unit 31, in the display form that is different between when the transmission to all the destinations is successful and when the transmission to one or more destinations is unsuccessful. The user thus clearly recognizes the event of an unsuccessful transmission in the broadcast job (successive jobs).

According to the embodiment, the multi-function apparatus is described as an example of the facsimile device of the embodiment of the disclosure. The embodiment may be applicable to a dedicated facsimile device, or a different type of image forming apparatus including the facsimile device. The transmission result display unit may include not only the mechanism including the display screen but also a mechanism that notifies the transmission results by producing a notification sound or by flashing light.

The facsimile device and the display control method of the facsimile device find applications not only in the dedicated the facsimile device but also in the image forming apparatus, such as a multi-function apparatus having the facsimile functionality.

The present disclosure contains subject matter related to that disclosed in Japanese Priority Patent Application JP 2018-020232 filed in the Japan Patent Office on Feb. 7, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A facsimile device performing a successive broadcast to a plurality of destinations, comprising:
    a memory that stores data;
    a transmitting unit that transmits the stored data to the destinations by calling the destinations;
    a determination unit that determines whether the transmission to each of the destinations is successful or unsuccessful;
    a transmission result holding unit that holds a result of the transmission determined by the determination unit in association with the destination; and
    a transmission result display unit that displays, subsequent to an end of the transmission, a number of the destinations, a number of unsuccessful transmissions and an indication that the transmission is unsuccessful in one display screen simultaneously based on the result of the transmission held by the transmission result holding unit if the transmission to one or more of the destinations is unsuccessful.

2. The facsimile device according to claim 1, further comprising a detail display unit that displays the destination and the result of the transmission to the destination, wherein
    the transmission result display unit displays the number of the destinations, the number of unsuccessful transmissions and the indication that the transmission is unsuccessful, and displays a detail key which prompts a user to cause the detail display unit to display the destination and the result of the transmission only if the transmission to the one or more of the destinations is unsuccessful.

3. An image forming apparatus comprising the facsimile device according to claim 1.

4. The facsimile device according to claim 1, wherein, if the transmission to the one or more of the destinations is unsuccessful, the facsimile device outputs the number of the destinations, a number of successful transmissions and an indication that the transmission is successful, and the number of unsuccessful transmissions and the indication that the transmission is unsuccessful in a communication log simultaneously.

5. A display control method of a facsimile device that performs a successive broadcast to a plurality of destinations, comprising:
    storing data on a first memory;
    transmitting the data stored on the first memory to the destinations by calling the destinations;
    determining whether the transmission to each of the destinations is successful or unsuccessful;
    holding, on a second memory, a result of the transmission determined in the determining in association with the destination; and
    subsequent to an end of the transmission, displaying a number of the destinations, a number of unsuccessful transmissions and an indication that the transmission is unsuccessful in one display screen simultaneously based on the result of the transmission held on the second memory if the transmission to one or more of the destinations is unsuccessful.

* * * * *